US011250071B2

(12) United States Patent
Thompson et al.

(10) Patent No.: US 11,250,071 B2
(45) Date of Patent: Feb. 15, 2022

(54) TRIGGER-BASED CONTEXTUAL INFORMATION FEATURE

(71) Applicant: Microsoft Technology Licensing, LLC, Redmond, WA (US)

(72) Inventors: Eric B Thompson, Seattle, WA (US); Jason Silvis, Bellevue, WA (US); Aaron Shepherd, Seattle, WA (US); Lyra Loxha, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 16/439,132

(22) Filed: Jun. 12, 2019

(65) Prior Publication Data

US 2020/0394221 A1 Dec. 17, 2020

(51) Int. Cl.
*G06F 16/908* (2019.01)
*G06F 16/904* (2019.01)
*G06F 16/9035* (2019.01)
*G06F 40/20* (2020.01)

(52) U.S. Cl.
CPC .......... *G06F 16/908* (2019.01); *G06F 16/904* (2019.01); *G06F 16/9035* (2019.01); *G06F 40/20* (2020.01)

(58) Field of Classification Search
CPC .. G06F 16/908; G06F 16/904; G06F 16/9035; G06F 40/20
USPC ....................................................... 707/705
See application file for complete search history.

(56) References Cited

U.S. PATENT DOCUMENTS

| | | | | |
|---|---|---|---|---|
| 5,493,692 A | * | 2/1996 | Theimer | G06Q 10/107 340/5.74 |
| 5,812,865 A | * | 9/1998 | Theimer | G06F 9/547 379/88.13 |
| 6,356,956 B1 | * | 3/2002 | Deo | G06Q 10/109 709/200 |
| 9,286,144 B1 | * | 3/2016 | Kiyohara | G06F 16/5866 |
| 9,350,593 B1 | * | 5/2016 | Johnson | H04L 67/22 |
| 9,954,945 B2 | * | 4/2018 | Abou Mahmoud | H04L 67/1095 |
| 10,210,219 B2 | * | 2/2019 | Liu | G06F 16/24578 |
| 10,503,776 B2 | * | 12/2019 | Song | H04N 21/84 |

(Continued)

OTHER PUBLICATIONS

Ding D., "Method to Take Notes in Online Meeting," an IP.com Prior Art Database Technical Disclosure, Cisco Systems, Inc., Feb. 26, 2015, pp. 1-8. (Year: 2015).*

(Continued)

*Primary Examiner* — Phuong Thao Cao
(74) *Attorney, Agent, or Firm* — Talem IP Law, LLP

(57) ABSTRACT

For a trigger-based contextual information feature, user generated content can be received and stored in a file. Context, including at least a timestamp, can be obtained and stored as metadata for the user generated content. A trigger to display contextual information can be received. In response to receiving the trigger, current context can be obtained, including at least a current timestamp. One or more contexts of the obtained context can be identified to provide as the contextual information based on the current context including an amount of time between the timestamp and the current timestamp; and provided for display along with the user generated content. Such a feature can facilitate effective recall of the purpose or original intent of content based, in part, on time from original note.

20 Claims, 9 Drawing Sheets

(56) References Cited

U.S. PATENT DOCUMENTS

| | | | |
|---|---|---|---|
| 10,521,189 B1* | 12/2019 | Ryabov | G06F 40/289 |
| 11,042,596 B2* | 6/2021 | Goenka | G06F 16/9535 |
| 2006/0080321 A1* | 4/2006 | Horn | G06F 16/9535 |
| 2006/0089792 A1* | 4/2006 | Manber | G01C 21/3629 |
| | | | 701/408 |
| 2008/0115149 A1* | 5/2008 | Rupp | G06F 11/302 |
| | | | 719/318 |
| 2008/0256113 A1* | 10/2008 | Rasmussen | G06F 40/123 |
| 2008/0256114 A1* | 10/2008 | Rasmussen | G06F 40/123 |
| 2009/0030988 A1* | 1/2009 | Kuhlke | G06Q 10/107 |
| | | | 709/206 |
| 2009/0055742 A1* | 2/2009 | Nordhagen | G06F 16/48 |
| | | | 715/716 |
| 2010/0138416 A1* | 6/2010 | Bellotti | G06F 16/436 |
| | | | 707/736 |
| 2011/0050909 A1* | 3/2011 | Ellenby | G03B 17/24 |
| | | | 348/207.1 |
| 2011/0057790 A1* | 3/2011 | Martin | H04L 67/306 |
| | | | 340/539.13 |
| 2011/0099490 A1* | 4/2011 | Barraclough | G06Q 10/10 |
| | | | 715/764 |
| 2011/0239158 A1 | 9/2011 | Barraclough et al. | |
| 2011/0314049 A1* | 12/2011 | Poirier | H04N 1/00183 |
| | | | 707/769 |
| 2012/0212632 A1* | 8/2012 | Mate | G06F 16/51 |
| | | | 348/207.11 |
| 2013/0103764 A1* | 4/2013 | Verkasalo | G06Q 30/02 |
| | | | 709/204 |
| 2013/0125063 A1* | 5/2013 | Lee | G06F 3/04883 |
| | | | 715/854 |
| 2013/0151728 A1* | 6/2013 | Currier | H04N 21/4307 |
| | | | 709/248 |
| 2013/0238510 A1* | 9/2013 | Wieboldt | G06Q 10/103 |
| | | | 705/301 |
| 2013/0246912 A1* | 9/2013 | Siu | G06Q 10/10 |
| | | | 715/255 |
| 2014/0123002 A1* | 5/2014 | Wessling | G06F 40/169 |
| | | | 715/273 |
| 2014/0236958 A1* | 8/2014 | Vaughn | G06F 16/2228 |
| | | | 707/741 |
| 2015/0026176 A1* | 1/2015 | Bullock | G06F 16/9558 |
| | | | 707/736 |
| 2015/0039616 A1* | 2/2015 | Rolston | G06F 16/51 |
| | | | 707/737 |
| 2016/0027044 A1 | 1/2016 | Sharifi et al. | |
| 2016/0061623 A1* | 3/2016 | Pahwa | G01C 21/3626 |
| | | | 701/440 |
| 2016/0198239 A1* | 7/2016 | Shenkler | A63F 13/352 |
| | | | 725/10 |
| 2016/0293165 A1* | 10/2016 | Liu | G11B 27/034 |
| 2016/0293166 A1* | 10/2016 | Dalal | G10L 15/26 |
| 2016/0379641 A1* | 12/2016 | Liu | G11B 27/102 |
| | | | 704/235 |
| 2017/0006094 A1* | 1/2017 | Abou Mahmoud | |
| | | | G06F 12/1408 |
| 2017/0177707 A1* | 6/2017 | Watters | G06F 16/334 |
| 2017/0187771 A1* | 6/2017 | Falcon | H04L 65/4015 |
| 2018/0068019 A1* | 3/2018 | Novikoff | G06F 16/783 |
| 2018/0123900 A1* | 5/2018 | Dorr | H04L 41/145 |
| 2018/0343479 A1* | 11/2018 | Gibson | H04N 21/44222 |
| 2019/0147631 A1* | 5/2019 | Itoi | G06K 9/2063 |
| | | | 345/633 |
| 2019/0191218 A1* | 6/2019 | Cormican | H04N 21/4722 |
| 2019/0208277 A1* | 7/2019 | Lewis | H04N 21/2387 |
| 2019/0332948 A1* | 10/2019 | Dhondse | G06N 5/022 |
| 2019/0361720 A1* | 11/2019 | Balachandran | G06F 40/253 |

OTHER PUBLICATIONS

"International Search Report and Written Opinion issued in PCT Application No. PCT/US2020/030011", dated Jul. 30, 2020, 12 Pages.

* cited by examiner

TRIGGER-BASED CONTEXTUAL INFORMATION FEATURE

BACKGROUND

When users take short form, impromptu notes, one of the largest problems they face is attempting to recall the purpose or context of that note when they go to recall/review it later. This issue is even more pronounced when the note-taking context is far removed from when the note was first composed, either by the passage of time, other tasks/workflows that they've undertaken in the interim, or by intentionally or unintentionally archiving/dismissing the note from their immediate purview. Despite these concerns and problems, it is also imperative that the process of taking a note be simple, frictionless, and devoid of too much fuss (e.g. formatting, auto-population of content, ads, etc.).

BRIEF SUMMARY

A trigger-based contextual information feature ("contextual information feature") for electronic applications is provided. The described contextual information feature can in certain implementations ensure that context about user generated content that is helpful to effective recall of the purpose or original intent of the content is provided at a time that appropriately assists the user when they need it most while not getting in their way at the time of creation.

The contextual information feature can receive user generated content; and store the user generated content in a file. The contextual information feature can obtain context including at least a timestamp; and store the obtained context as metadata for the user generated content. The contextual information feature can receive a trigger to display contextual information. In response to receiving the trigger, the contextual information feature can obtain current context including at least a current timestamp. The contextual information feature can identify one or more contexts of the obtained context to provide as the contextual information based on the current context including an amount of time between the timestamp and the current timestamp; and provide the one or more contexts for display along with the user generated content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
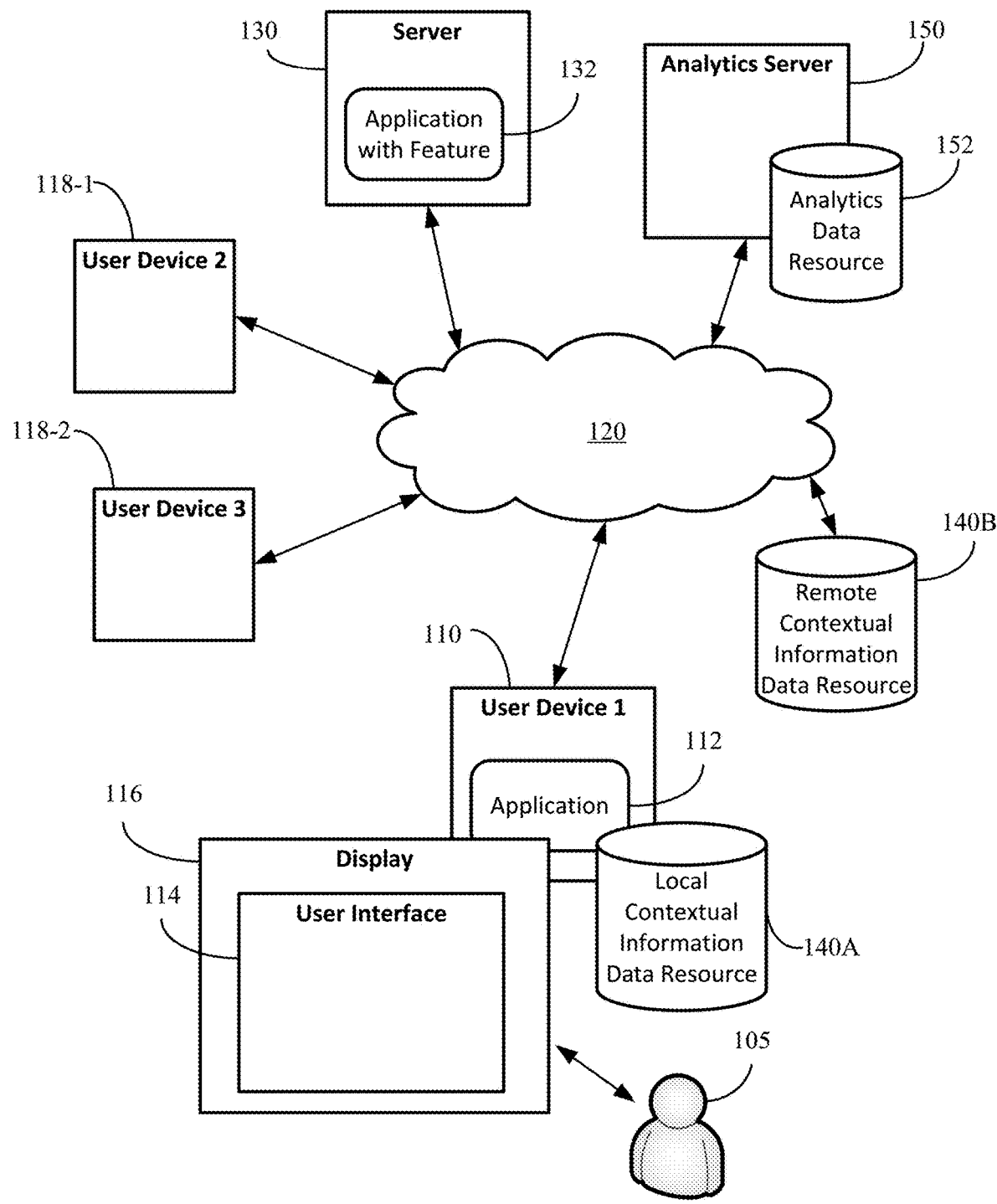
FIG. 1 illustrates an example operating environment in which various embodiments of the invention may be practiced.

A trigger-based contextual information feature ("contextual information feature") for electronic applications is provided. In to certain implementations, the described contextual information feature can ensure that context about a note that is imperative to effective recall of the purpose or original intent of the note is provided at a time that appropriately assists the user when they need it most, while not getting in their way at the time of creation. This can allow a user to more seamlessly understand what's needed about a note when they're trying to use it, while not interfering with their ability to quickly capture thoughts, ideas, or content. Advantageously, users can better understand what they meant or how they might use the note they've taken after some set time, or after actions that might make it more difficult to recall their original intent, without making the creation experience unpleasant.

Often, as the user writes down a note in the moment, they tend to have a lot of context in their brain or right around them. For example, a user may take notes while they are multitasking, such as in a meeting, on a conference call, attending a lecture, or browsing the Internet. However, users don't necessarily put that context into words before moving on to another activity. In some cases, users may take notes while they are multitasking.

Then, after a certain amount of time, the user will come back to that note and the context will not be included. Therefore, the user may not remember how to search for the context in order to recall the meaning of the note because the note does not have the keywords included or even when the user does find the note, they may not remember why they took the note. Advantageously, the contextual information feature can collect this context for the user and surface that context in the note itself.

The contextual information feature as described herein can receive user generated content; and store the user generated content in a file. The contextual information feature can obtain context including at least a timestamp; and store the obtained context as metadata for the user generated content. The contextual information feature can receive a trigger to display contextual information. In response to receiving the trigger, the contextual information feature can obtain current context including at least a current timestamp. The contextual information feature can identify one or more contexts of the obtained context to provide as the contextual information based on the current context including an amount of time between the timestamp and the current timestamp; and provide the one or more contexts for display along with the user generated content.

The one or more contexts of the obtained contexts can be a set of contexts. In some cases, the contextual information feature can receive a second trigger to display second contextual information. In response to receiving the second trigger, the contextual information feature can obtain second current context including at least a second current timestamp. The second current timestamp may be from a later period of time from a first current timestamp. The contextual information feature can identify a second set of contexts of the obtained context to provide as the second contextual information based on the current context including an amount of time between the timestamp and the current timestamp; and provide the second set of contexts for display along with the user generated content. The second set of context can be additional or different context as compared to that provided in response to the first trigger.

FIG. 1 illustrates an example operating environment in which various embodiments of the invention may be practiced. Referring to FIG. 1, a user 105 may interact with a user device 110 running an application 112, such as a note taking application or other productivity application, and view a UI 114 of the application 112 displayed on a display 116 associated with the user device 110.

Figure 6:
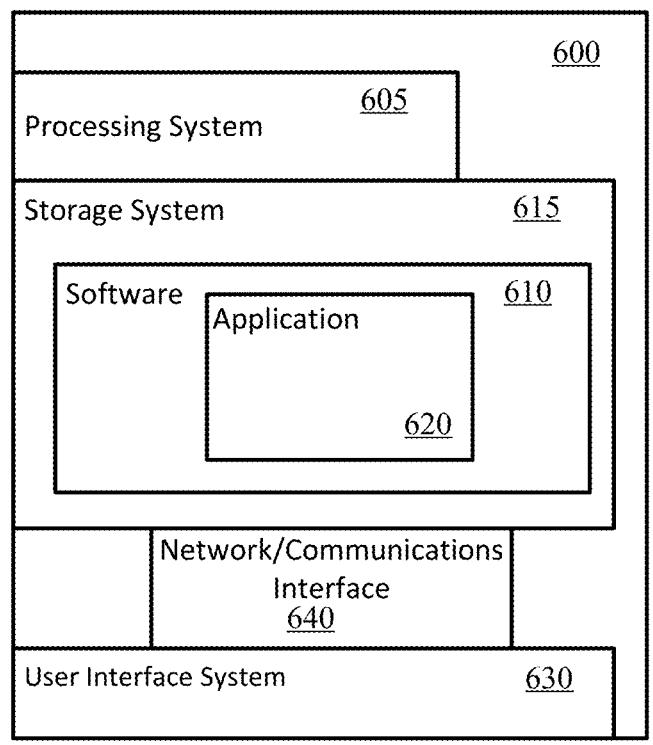
FIG. 6 illustrates components of a computing device that may be used in certain embodiments described herein.

User device 110 may be embodied such as described with respect to system 600 of FIG. 6 and configured to receive input from a user (e.g., user 105) through, for example, a keyboard, mouse, trackpad, touch pad, touch screen, microphone, or other input device. The display 116 of the user device 110 is configured to display one or more user interfaces (including UI 114) to the user 105. In some embodiments, the display 116 can include a touchscreen such that the user device 110 may receive user input through the display.

The UI 114 enables a user to interact with application 112, running on or displayed through the user device 110. For example, UI 114 may include a canvas through which user generated content can be created or consumed. The UI 114 may also include the use of a context menu, a menu within a menu bar, a menu item selected from a ribbon user interface, a graphical menu, and the like. Generally, UI 114 is configured such that a user may easily interact with functionality of an application. For example, a user may simply select (via, for example, touch, clicking, gesture or voice) an option within UI 114 to perform an operation such as formatting content being authored in application 112.

In some cases, the user 105 may have multiple devices running a similar program and the user 105 can view contextual information provided, as will be described in more detail herein, along with user generated content (or other content) across multiple user devices (such as second user device 118-1 and/or third user device 118-2).

The user device 110 (as well as the second user device 118-1 and the third user device 118-2) may operate on or in communication with a network 120, and may communicate with one or more servers 130 supporting contextual information services over the network 120.

The user device 110 can be, but is not limited to, a personal computer (e.g. desktop computer), laptop, personal digital assistant (PDA), video game device, mobile phone (or smart phone), tablet, slate, terminal, holographic-enabled device, and the like. It should be apparent that the user device 110 may be any type of computer system that provides its user the ability to load and execute software programs and the ability to access a network, such as network 120. The second user device 118-1 and the third user device 118-2 may include the same types of devices (or systems) as user device 110 and they may or may not be of a same form. For example, a user 105 may have a laptop, a tablet, and a smart phone as the three devices.

Application 112 may be a program for creating or consuming content, such as a productivity application. Example applications for creating or consuming content include word processing applications such as MICROSOFT WORD, email applications, layout applications, note-taking applications such as MICROSOFT ONENOTE, EVERNOTE, and GOOGLE KEEP, sticky note applications such as MICROSOFT Sticky Note and EVERNOTE Sticky Notes, presentation applications, and reader applications such as GOOGLE READER, APPLE iBooks, ACROBAT eBook Reader, AMAZON KINDLE READER, and MICROSOFT Reader (and those available on designated hardware readers such as AMAZON KINDLE READER).

Application 112 may be a client-side application or may be a web browser (e.g., a standard Internet browser) used to access a web-based application (e.g., application 132 running on server 130 or hosted on a cloud). Thus, the application with contextual information feature may be a client-side application and/or a non-client side (e.g., a web-based) application. In some cases, application 112 can communicate with server application 132 having the contextual information feature and running on server 130 (and which may provide the contextual information service).

Contextual information feature may be integrated with application 112 as an inherent feature of application 112 or as a plug in or extension for an existing application 112 to provide the contextual information feature. Although primarily described herein as being incorporated with application 112 at the user device 110 (or application 132 at server 130), contextual information feature may, in some cases, be available through a separate device from the user device 110 (and application 112 or 132).

The contextual information feature includes or communicates with one or more data resources, such as contextual information data resource 140 (e.g., local contextual information data resource 140A or remote contextual information data resource 140B, associated with server 130 or accessible through the cloud) and analytics data resource 152 (associated with analytics server 150), each of which may store data sets. It should be understood that these data resources may be the same or different data resources.

The contextual information data resource 140 may store a plurality of files with user generated content and associated metadata. The user generated content can be any content the user actively acted to insert or create within a user interface of an application. The associated metadata can include any context obtained by the contextual information feature and stored as metadata for the user generated content. The context obtained by the contextual information feature includes at least a timestamp indicating the date and/or time at which the user generated content was created.

In some cases, the context can include, but is not limited to, a user ID, a current date/time (e.g., the timestamp), certain actions or inactions by a user, location (geo-location, home, office, mobile), content, client type, application type, application state, file, and the like. Context can also include immediately preceding interactions of the user with the note or with other applications. This context can be considered user-specific data. Other user-specific data that may be stored (and used by the feature) includes user history information. The user history information can include a past history of the user's interaction with the user generated data and contextual information, including user feedback. For example, the user history information can include that a user dismissed a portion of the contextual information displayed to the user.

The contextual information data resource 140 stores user specific data (and therefore should be understood to be managed according to appropriate privacy guidelines).

With the user's permission, the user specific data (including user history information) may be anonymized and stored in the analytics data resource 152. The analytics data resource 152 can contain an aggregate of anonymized user specific data for a plurality of users ("aggregated data"). For example, user specific data from other users of the same or other computing devices can be communicated over the network 120 and stored in the analytics data resource 152. The aggregated data may be managed by analytics server 150. In some cases, the aggregated data may be managed by a server (e.g., server 130) or service associated with the application 112.

It should be understood that usage data does not require personal information and any information considered to be personal or private would be expected to be expressly permitted by the user before such information was stored or used. It should be understood that any data stored regarding specific users would be done in a matter following established norms and rules for privacy (and generally involve user approval).

Components (computing systems, storage resources, and the like) in the operating environment may operate on or in communication with each other over the network 120. The network 120 can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 120 may include one or more connected networks (e.g., a multi-network environment) including public networks, such as the Internet, and/or private networks such as a secure enterprise private network. Access to the network 120 may be provided via one or more wired or wireless access networks as will be understood by those skilled in the art.

Communication to and from the components may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Figure 2:
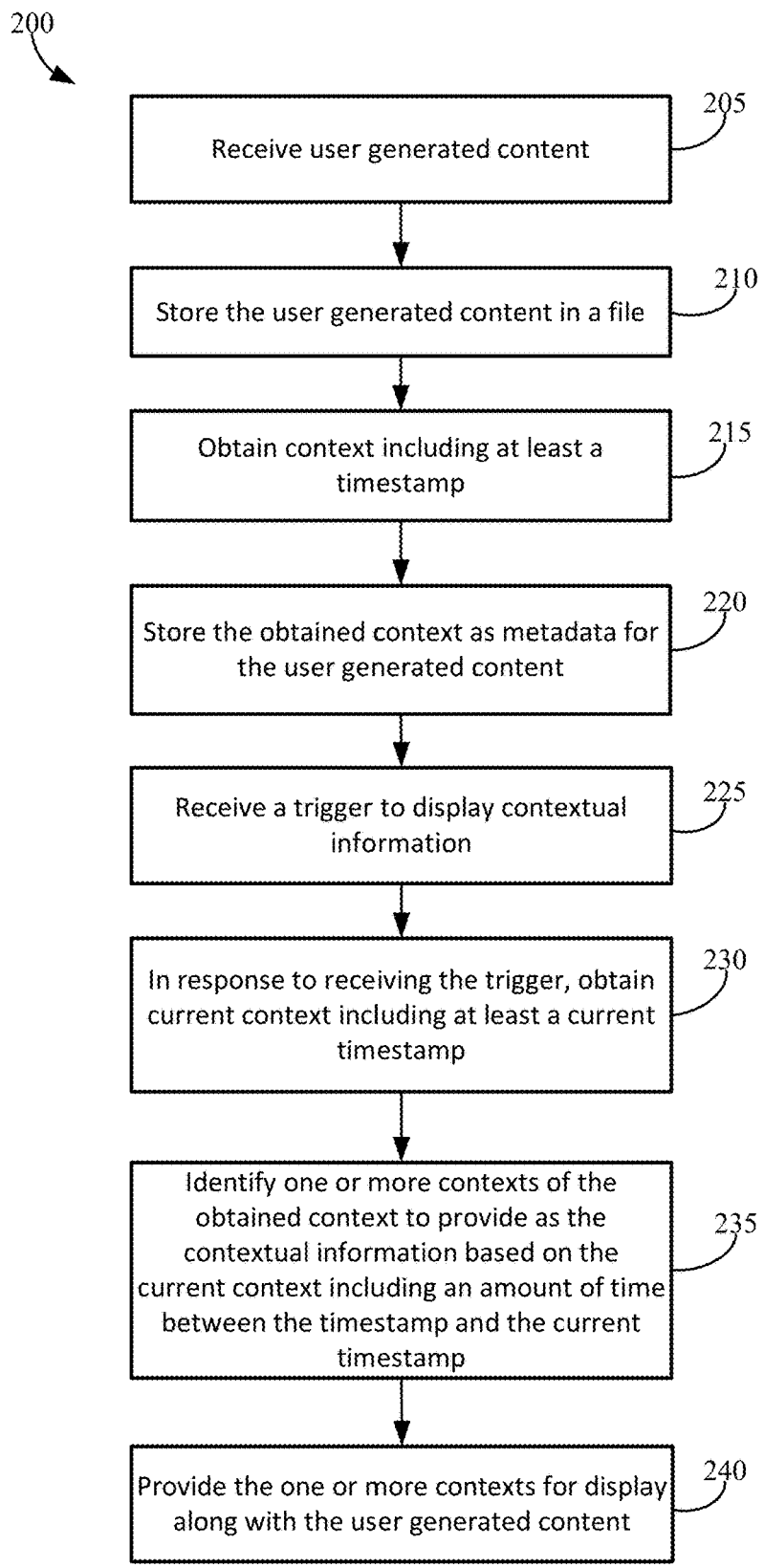
FIG. 2 illustrates an example process flow diagrams for providing trigger-based contextual information capabilities according to certain embodiments of the invention.

FIG. 2 illustrates an example process flow diagrams for providing trigger-based contextual information capabilities according to certain embodiments of the invention. A contextual information feature performing process 200 can be implemented by server 130 such as shown in FIG. 1, which can be embodied as described with respect to computing system 700 shown in FIG. 7 and even, in whole or in part, by user device 110, which can be embodied as described with respect to computing system 600 as shown in FIG. 6. Process 200 may be performed entirely on a user's computing device and even offline in some cases.

Referring to FIG. 2, the contextual information feature can receive (205) user generated content and can store (210) the user generated content in a file. As previously described, the user generated content can be received from any productivity application, such as a sticky note application, a note taking application, or a task application as some examples.

The user generated content is any content a user actively acted to insert or create within a user interface of an application. The user generated content can be content input from a user through, for example, a keyboard, a mouse, trackpad, touch pad, touch screen, microphone, or other input device. In some cases, the user generated content may be a natural language statement, sentence, or phrase. In some cases, the user generated content may be an image or text inserted/copied into a file. In some cases, the user generated content may be one or more words. For example, when a user creates a note by typing in content or inking content within a user interface of a sticky note application, the content may be provided to the contextual information feature as the user generated content and stored in a file.

The contextual information feature can obtain (215) context including at least a timestamp. The timestamp indicates a time of creation of the user generated content. In some cases, the timestamp can further include day of week (e.g., "Monday") in addition to the date (e.g., month, day, year) and time.

In various implementations, the context can include, but is not limited to, a user ID, a current date/time, certain actions or inactions by a user, location (geo-location, home, office, mobile), content, client type, application type, application state, file, and the like. The context can be used provide contextual information that may help jog the user's memory when viewing the user generated content at a later time. Indeed, as a user is creating the user generated content, the context can be obtained to help identify, for example, the user's physical location, meetings the user was in and out of, or a document the user opened.

The context may be very granular context. In some cases, the context can include context preceding the user entering the user generated content. In some cases, the context can include context following the user entering the user generated content. The context may be obtained at certain pauses in the entry of content, at the time of a save command, at an end of a session, at certain intervals, or based on some other action or inaction.

In some cases, the contextual information feature may communicate with a device operating system and GPS to obtain the context. For example, the context can include the location of the user when the user is creating the note. The location may be in the form of geo-coordinates (e.g., a longitude and a latitude), Cell ID, address, computer name, or the like.

In some cases, the context can include information from the user generated content. For example, when the content is something the user pasted into the note itself, such as web-based content, the context can be the URL of the source of the content.

In some cases, context can include what system or platform the user is currently using. In some cases, the context can include the type of device the user is currently using (e.g., a desktop versus a mobile phone).

In some cases, the context can include other applications the user is interacting with. For example, the context can include a song that the user was listening to while writing the user generated content.

In some cases, the context can include other documents the user is viewing or interacting with. For example, the context can include that the user generated content was entered while a certain document was open. In another example, the context can include that the user edited a certain document right after taking a note.

In some cases, the context can include Internet content the user is viewing or interacting with. For example, the context can include content from any websites the user was viewing or interacting with.

In some cases, the context can include information from a user's calendar. For example, the context can include meeting information, such as the subject of the meeting, the people in the meeting, the contact information of the people in the meeting, the location of the meeting, whether the meeting was a conference call or a video conference call, the start time and end time of the meeting, and the description of the meeting.

In some cases, the context can include information from a user's email. For example, the context can include information from emails sent or received while the user is entering the user generated content.

The contextual information feature can store (220) the obtained context as metadata for the user generated content. At this point, the context is stored as metadata associated with the user generated content and is not displayed to the user. Since, at the time of creation, the context is already fresh in the user's mind as to why the user wrote down the content, the context is not displayed. By not displaying the context immediately, it is possible to minimize distraction or interference with the user's ability to quickly capture thoughts, ideas, or content.

Advantageously, since the context is stored as metadata for the user generated content, the contextual information feature knows the context surrounding the user generated content and can provide that context at the appropriate times.

Indeed, as a user is writing down content (e.g., a note) in the moment, they may have a lot of context in their brain or right around them. Users don't always write down the context that they need in order to remember the purpose of the note long term. For example, the act of taking a note may actually be a secondary activity (e.g., while the user is multitasking). After a certain amount of time, if it is not immediate, the user may come back to that note and that context (e.g., that was in their head or elsewhere on their screen) will not be there. Thus, it becomes more likely for the user to forget what that note was about. Advantageously, the contextual information feature can obtain the context helpful to effectively recall the purpose or original intent of the note.

The contextual information feature can receive (225) a trigger to display contextual information. The trigger can include, but is not limited to, a threshold amount of time from the timestamp, an amount of user activity (e.g., a number of other tasks/workflows that a user has undertaken in the interim), an intentional or unintentional archiving or dismissing of the file from a user's immediate view, an attempt to retrieve the user generated content, or a combination thereof.

In some cases, the contextual information feature may periodically perform a check of times of content creation (e.g., the timestamp). If the amount of time from the time of creation is past a threshold amount, the contextual information feature may receive a trigger to display contextual information. For example, if the threshold amount is 24 hours, then the contextual information feature will receive a trigger to display contextual information for any user generated content not created within the past 24 hours.

In some cases, the contextual information feature can learn (e.g., using an analytics server 150 as described with respect to FIG. 1) the most appropriate threshold amount. For example, an initial amount of time may be used as the threshold amount and then adjusted based on user feedback.

In some cases, the initial threshold amount of time may be the average amount of time in which people lose context for a piece of content based on usability studies. The analytics system may use any suitable machine learning process to learn the most appropriate threshold amount.

In some cases, the trigger can be an amount of user activity (e.g., a number of other tasks/workflows that a user has undertaken in the interim). For example, a user may create a note while working in multiple other applications. Since the user has been working in multiple other applications, the user may be unable to remember the context for that note. In this case, based on the number of other tasks the user has undertaken since creating the note, the contextual information feature can receive a trigger to display contextual information in order to provide the user with the context for that note.

In another example where the trigger is an amount of user activity, a user may create ten notes in one day; and the user may not remember why they created each of the notes. In this case, based on the amount of notes the user created (e.g., user activity), the contextual information feature can receive a trigger to display contextual information in order to provide the necessary context to differentiate between these ten notes.

In some cases, the trigger can be an attempt to retrieve the user generated content. For example, a user may input content into note taking application and close the file. Then, when the user attempts to retrieve the user generated content, the contextual information feature can receive a trigger (due to retrieval action) to display contextual information.

It should be understood that as time passes, additional triggers may be received by the contextual information feature. For example, as time passes, different lengths of time since the original creation of the note can be received as triggers by the contextual information feature in order to trigger the providing of additional contextual information.

In response to receiving the trigger (e.g., step 225), the contextual information feature can obtain (230) current context including at least a current timestamp. The current context can include, but is not limited to, a user ID, a current date/time (e.g., the current timestamp), certain current actions or inactions by a user, current location (geo-location, home, office, mobile), current content, current client type, current application type, current application state, current file, and the like.

The contextual information can help users better understand what they meant or how they might use the thoughts they've written after some set time or after actions that might make it more difficult to recall their original intent.

The contextual information feature can identify (235) one or more context of the obtained context to provide as the contextual information based on the current context including an amount of time between the timestamp and the current timestamp.

The contextual information feature can provide the most appropriate contextual information to the user based on, for example, the amount of time that has passed, the current context for the user, priority of context, user feedback, or a combination thereof.

As time passes, the more difficult it may be to remember the context in which you were writing down content. Thus, over time additional contextual information may be provided to the user. If the amount of time between the timestamp in the current timestamp is one week, the contextual information feature may only identify one or two contexts of the obtained contexts to provide as the contextual information. However, if the amount of time between the timestamp in the current timestamp is one year, then much more contextual information may be provided.

The contextual information feature can use the current context to identify which of the obtained context to provide as the contextual information. In some cases, the contextual information feature can use the current context of a current location to identify which of the obtained context to provide. In an example where a user takes a note in a location, such as their house, if the user is still at that location when the user attempts to retrieve the user generated content in the note a week later, it would not be helpful to provide the user with contextual information saying they took this note at their house.

In some cases, the one or more context of the obtained context can be identified based on a priority of context. In an example where the user is always in meetings with a person named John, context relating to meeting information would have a low priority since it would not helpful to keep showing the user that they were in a meeting with John when they took the note.

In some cases, the contextual information feature can take into consideration the user's prior feedback. Users may find different pieces of context helpful; and the user's feedback (e.g., dismissal) about context can help identify which contextual information is saved and displayed in the future. For example, if a user always dismisses contextual information related to a specific location, the contextual information feature can flag that specific context to not be provided in the future.

The contextual information feature may use the user specific data stored in contextual information data resource 140 or aggregated data stored in analytics data resource 152, as described with respect to FIG. 1, when using the user feedback to identify the one or more contexts of the obtained context to provide as the contextual information.

In some cases, the contextual information feature may identify the one or more contexts of the obtained context based on an amount of text in the user generated content. In an example where the user only wrote the numbers "5" and "12" down, the contextual information feature may identify multiple contexts in order to help the user remember why they wrote those numbers down at a later time.

In an illustrative example where a user is attending a conference, the user may be taking multiple pages of notes throughout the different sessions of the conference. When the user returns home and reviews the notes, the user may not remember exactly which session of the conference the notes were written. The contextual information feature may know the times of each session from the user's calendar and can see, based on the timestamps, which note is associated with each session. The contextual information feature may provide contextual information indicating that a portion of the notes correlate to the first session of the day, and notes added a couple hours later correlate to the evening session.

The contextual information feature can provide (240) the one or more context for display along with the user generated content. The one or more context can be provided for display along with user generated content in a variety of ways.

In some cases, the one or more context may be inserted into the file containing the user generated content. The one or more context may appear as part of the user generated content. In some cases, the one or more context may be stylized to be visually distinguishable from the user generated content. In some cases, the one or more context may be provided as a footer in the user interface containing the user generated content.

In some cases, the one or more contexts may be stored in the file along with the user generated content. In this case, the one or more contexts stored in the file along with user generated content will be displayed each time the user accesses the file. Additional contexts may be identified and provided for display over time.

In some cases, the one or more contexts may be temporarily provided for display along with the user generated content. In this case, the one or more contexts provided for display may change over time. For example, when a user opens a note one week from the time of creation, the date of creation may be displayed to the user. Then, the next time the user opens that note, for example, six months from the time of creation, multiple different contexts may be displayed to the user, such as location and the people the user was with when creating the note.

In some cases, the one or more context may be provided in a user interface that is separate from the user interface containing the user generated content.

In some cases, the one or more context may be provided in a way that the user can take action on the one or more context. For example, the user may be able to remove or dismiss the context if the user finds the context is inappropriate or undesired.

In an illustrative example of providing one or more contexts for display along with the user generated content, a user may have taken a note about a sushi restaurant they really liked, but all they wrote down is "seattlesushi.com." If the user comes back to that note a few weeks later, the contextual information feature can provide additional information for the user, such as the name of the restaurant, the address of the restaurant, photos from the restaurant's website, and the restaurant's rating.

Figure 3A:
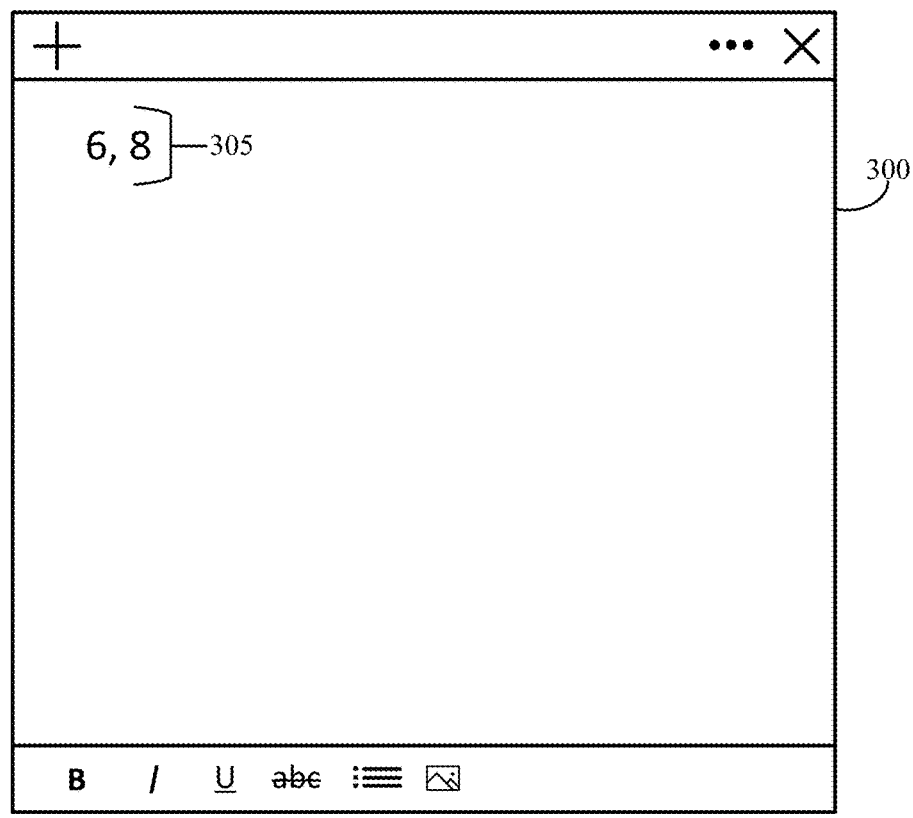
FIGS. 3A-3C illustrate example scenarios for providing trigger-based contextual information capabilities according to example embodiments of the invention.
Figure 3B:
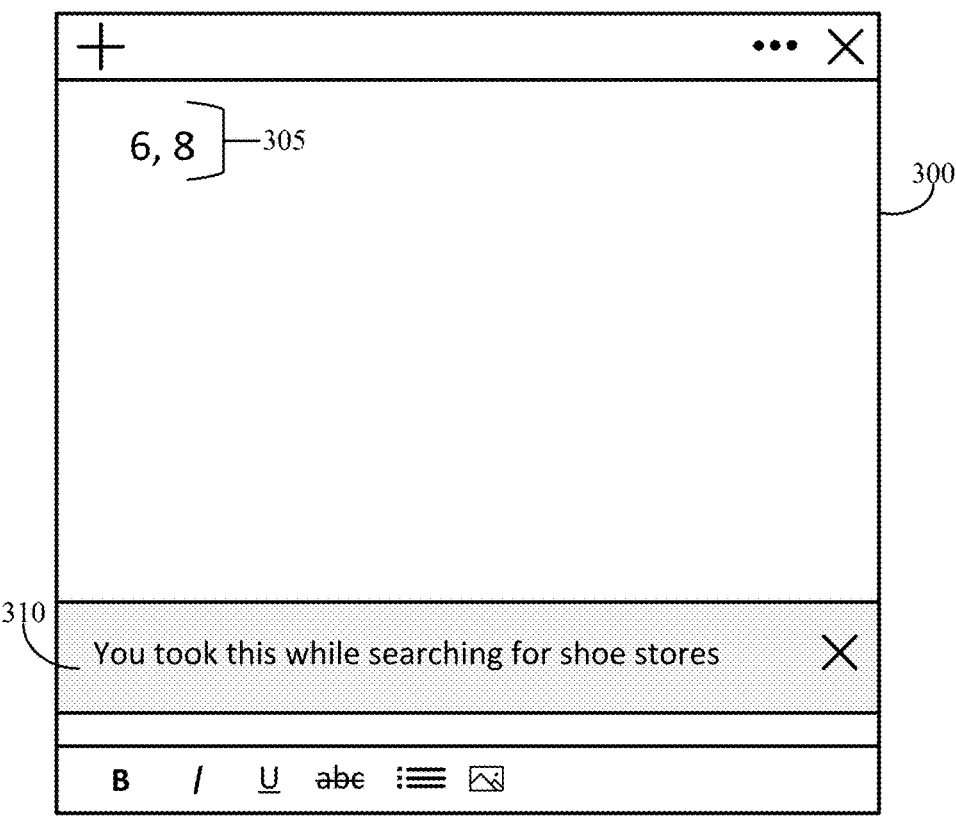
Figure 3C:
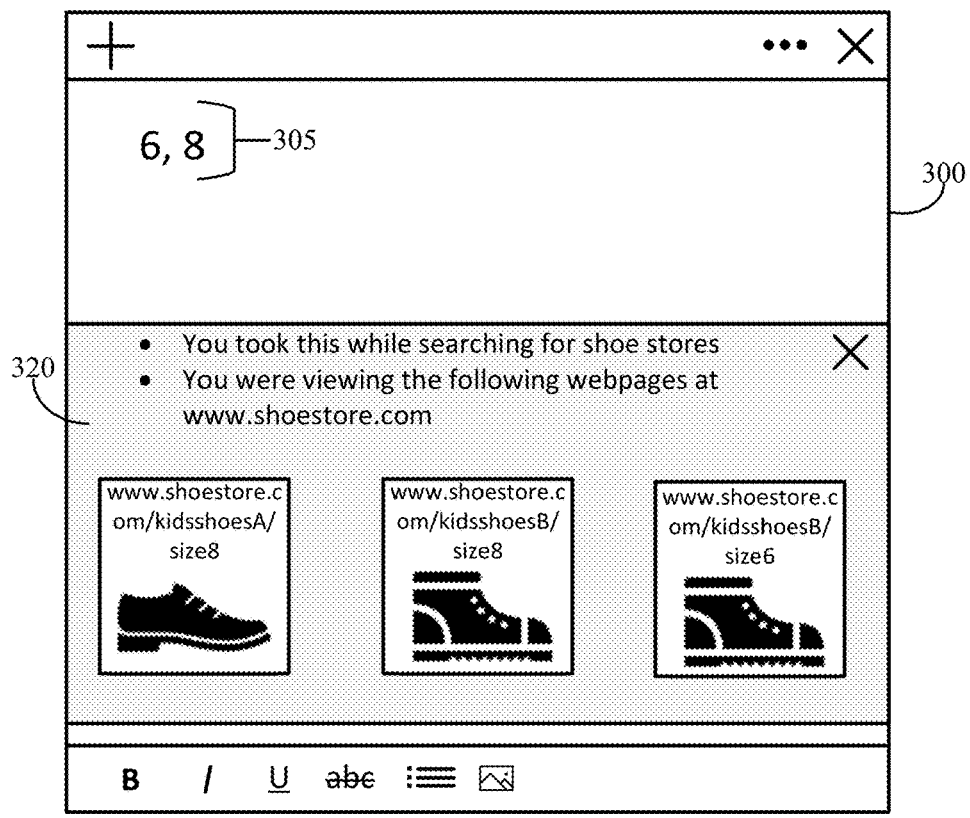

FIGS. 3A-3C illustrate example scenarios for providing trigger-based contextual information capabilities according to example embodiments of the invention. A user may open a user interface of a sticky note 300 of a sticky note application having a contextual information feature on their computing device (embodied, for example, as system 600 described with respect to FIG. 6). The contextual information feature may be part of a background process or 'always running' type of process such that contextual information is provided to the user without a direct request.

Referring to FIG. 3A, a user can enter user generated content into the user interface of the sticky note 300. As the user starts interacting with the sticky note 300, process 200 as described with respect to FIG. 2 can be initiated. Indeed, the contextual information feature can receive the user generated content (e.g., step 205), store the user generated content in a file (e.g., step 210), obtain context at least a timestamp (e.g., step 215), and store the obtained context as metadata for the user generated content (e.g., step 220).

In the illustrative example, the user created a sticky note 300 and wrote down two shoe sizes as user generated content 305 (i.e., "6, 8") while the user was searching for shoe stores in a web browser. In particular, the user was viewing webpages for the website "www.shoestore.com" when they wrote down the shoe sizes.

Referring to FIGS. 3B and 3C, after a period of time, the user can view the sticky note 300. As the user views the sticky note 300 after an amount of time has passed, contextual information is displayed in order to provide an effective recall of the purpose or original intent of sticky note. Indeed, the contextual information feature can receive a trigger (e.g., the amount of time, the opening of the note, etc.) to display contextual information (e.g., step 225), in response to receiving the trigger, obtain current context including at least a current timestamp (e.g., step 230), identify one or more contexts of the obtained context to provide as the contextual information based on the current context including an amount of time between the timestamp in the current timestamp (e.g., step 235), and provide the one or more context for display along with the user generated content (e.g., step 240).

In the illustrative example of FIG. 3B, one week after the time of creation the user retrieves the user generated content 305 in the sticky note 300 and contextual information 310 is displayed along with the user generated content 305. Since the amount of time passed from the time of creation is only one week, the user may only need minimal contextual information to remember that the user generated content 305 "6, 8" are shoe sizes. Thus, the contextual information 310 displayed to the user in that the sticky note 300 includes "You took this note while searching for shoe stores."

In the illustrative example of FIG. 3C, one year after the time of creation the user retrieves the sticky note 300 and contextual information 320 is displayed along with the user generated content 305. Since the amount of time passed since the time of creation is much greater than the one week described in FIG. 3B, the user may have a greater chance of forgetting the context surrounding the user generated content 305 and may need additional contextual information to remember that user generated content 305 "6, 8" are shoe sizes. Therefore, the contextual information 320 displayed to the user in that the sticky note 300 includes not only the context that the user was searching for shoe stores, but also the context showing details from the particular websites the user was viewing. The contextual information 320 includes "You took this note while searching for shoe stores," as well as "You were viewing the following webpages at www.shoestore.com" and three thumbnails of the webpages.

Figure 4A:
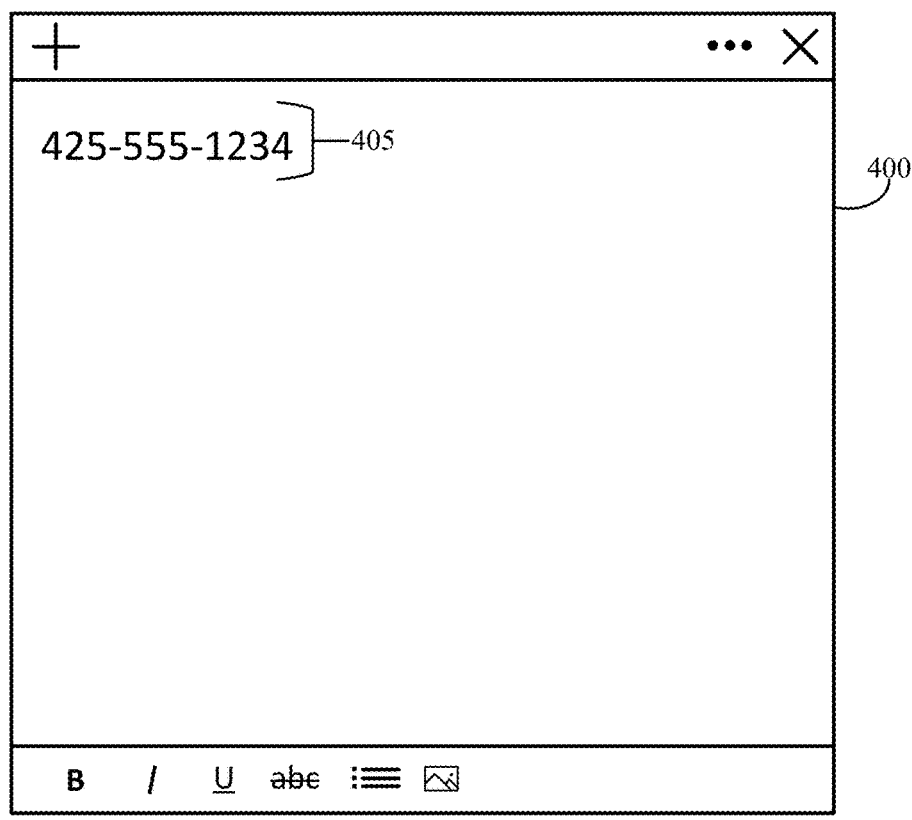
FIGS. 4A-4C illustrate example scenarios for providing trigger-based contextual information capabilities according to example embodiments of the invention.
Figure 4B:
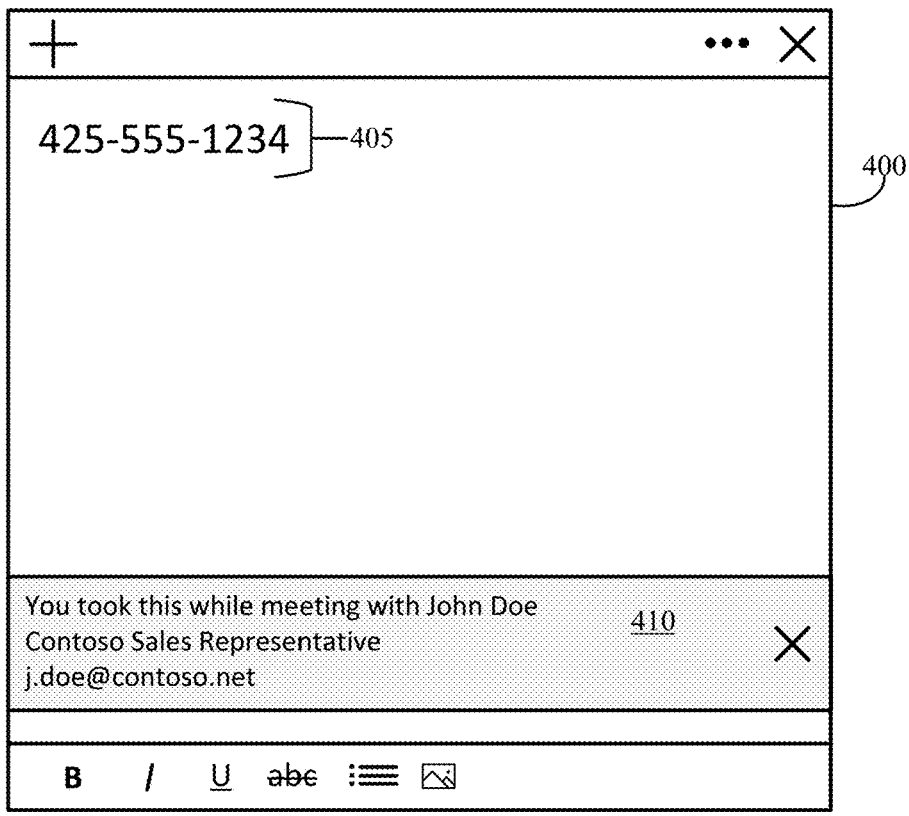
Figure 4C:
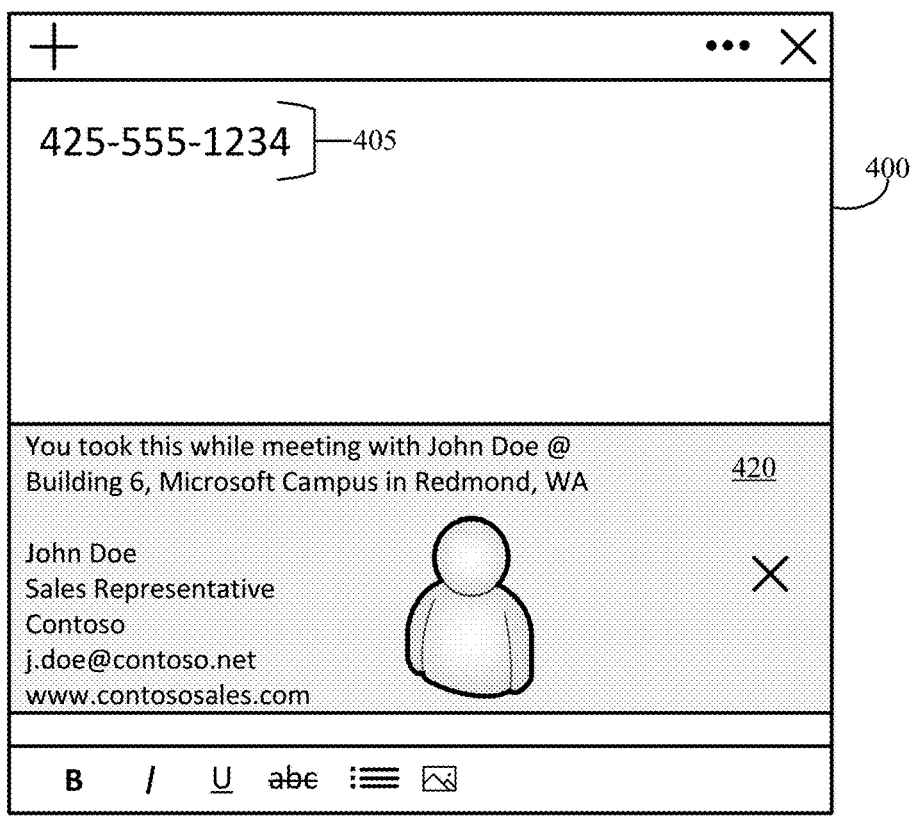

FIGS. 4A-4C illustrate example scenarios for providing trigger-based contextual information capabilities according to example embodiments of the invention. A user may open a user interface of a sticky note 400 of a sticky note application having a contextual information feature on their computing device (embodied, for example, as system 600 described with respect to FIG. 6). The contextual information feature may be part of a background process or 'always running' type of process such that contextual information is provided to the user without a direct request.

Referring to FIG. 4A, a user can enter user generated content into the user interface of the sticky note 400. As the user starts interacting with the sticky note 400, process 200 as described with respect to FIG. 2 can be initiated. Indeed, the contextual information feature can receive the user generated content (e.g., step 205), store the user generated content in a file (e.g., step 210), obtain context at least a timestamp (e.g., step 215), and store the obtained context as metadata for the user generated content (e.g., step 220).

In the illustrative example, the user created a sticky note 400 and wrote down a telephone number as user generated content 405 (i.e., "425-555-1234") during a meeting with John Doe, a representative for Cortana. The meeting took place in Building 6 on the Microsoft Campus in Redmond, Wash.

Referring to FIGS. 4B and 4C, after a period of time, the user can view the sticky note 400. As the user views the sticky note 400 after an amount of time has passed, contextual information is displayed in order to provide an effective recall of the purpose or original intent of sticky note. Indeed, the contextual information feature can receive a trigger to display contextual information (e.g., step 225), in response to receiving the trigger, obtain current context including at least a current timestamp (e.g., step 230), identify one or more contexts of the obtained context to provide as the contextual information based on the current context including an amount of time between the timestamp in the current timestamp (e.g., step 235), and provide the one or more context for display along with the user generated content (e.g., step 240).

In the illustrative example of FIG. 4B, one month after the time of creation (and while at the same location) the user retrieves the sticky note 400 and contextual information 410 is displayed along with the user generated content 405.

Since the amount of time passed from the time of creation is one month and the user is in the same location, the user may only need some contextual information to remember that the telephone number in the user generated content 405 belongs to John Doe. Thus, the contextual information 410 displayed to the user in that the sticky note 400 includes "You took this while in a meeting with John Doe." The contextual information 410 includes additional information for John Doe, such as his position "Contoso Sales Representative" and his email j.doe@contoso.net that may be helpful for the user.

In the illustrative example of FIG. 4C, two years after the time of creation the user retrieves the sticky note 400 and contextual information 420 is displayed along with the user generated content 405. In this case, the user's location is now in New York City. Since the amount of time passed since the time of creation is much greater than the one month described in FIG. 4B, and the user is far removed from where the note was created, the user may have a greater chance of forgetting the context surrounding the user generated content 405. In this case, based on at least the one year between the time of creation and the current time, as well as the user's current location, the contextual information 420 displayed to the user in that the sticky note 400 includes not only the context that the user in a meeting with John Doe, but also the context showing where the meeting took place and contact information for John Doe. Indeed, the contextual information 420 includes "You took this while meeting with John Doe @Building 6, Microsoft Campus in Redmond, Wash.," as well as John Doe's contact information, such as email, website, and image.

Figure 5A:
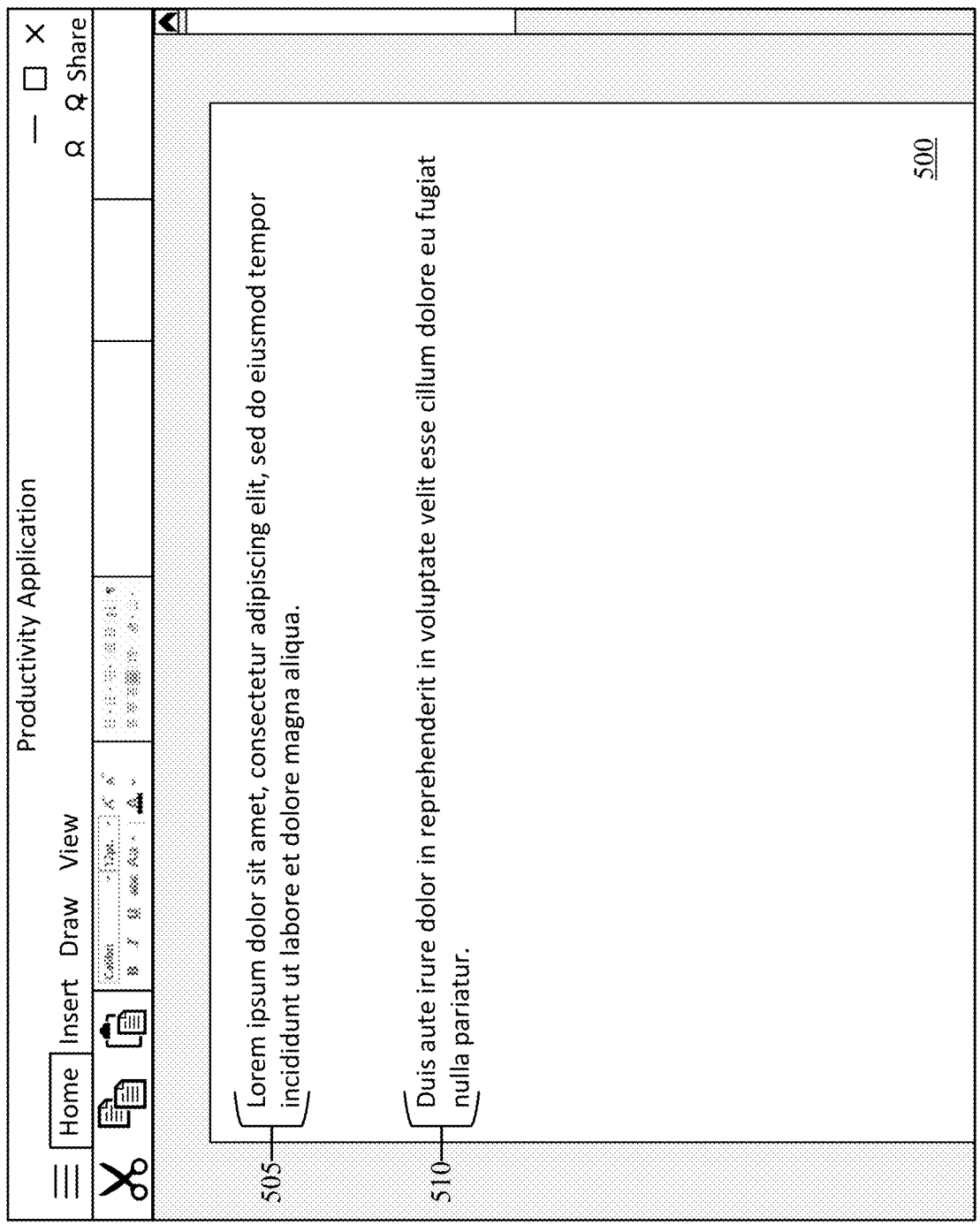
FIGS. 5A-5C illustrate example scenarios for providing trigger-based contextual information capabilities according to example embodiments of the invention.
Figure 5B:
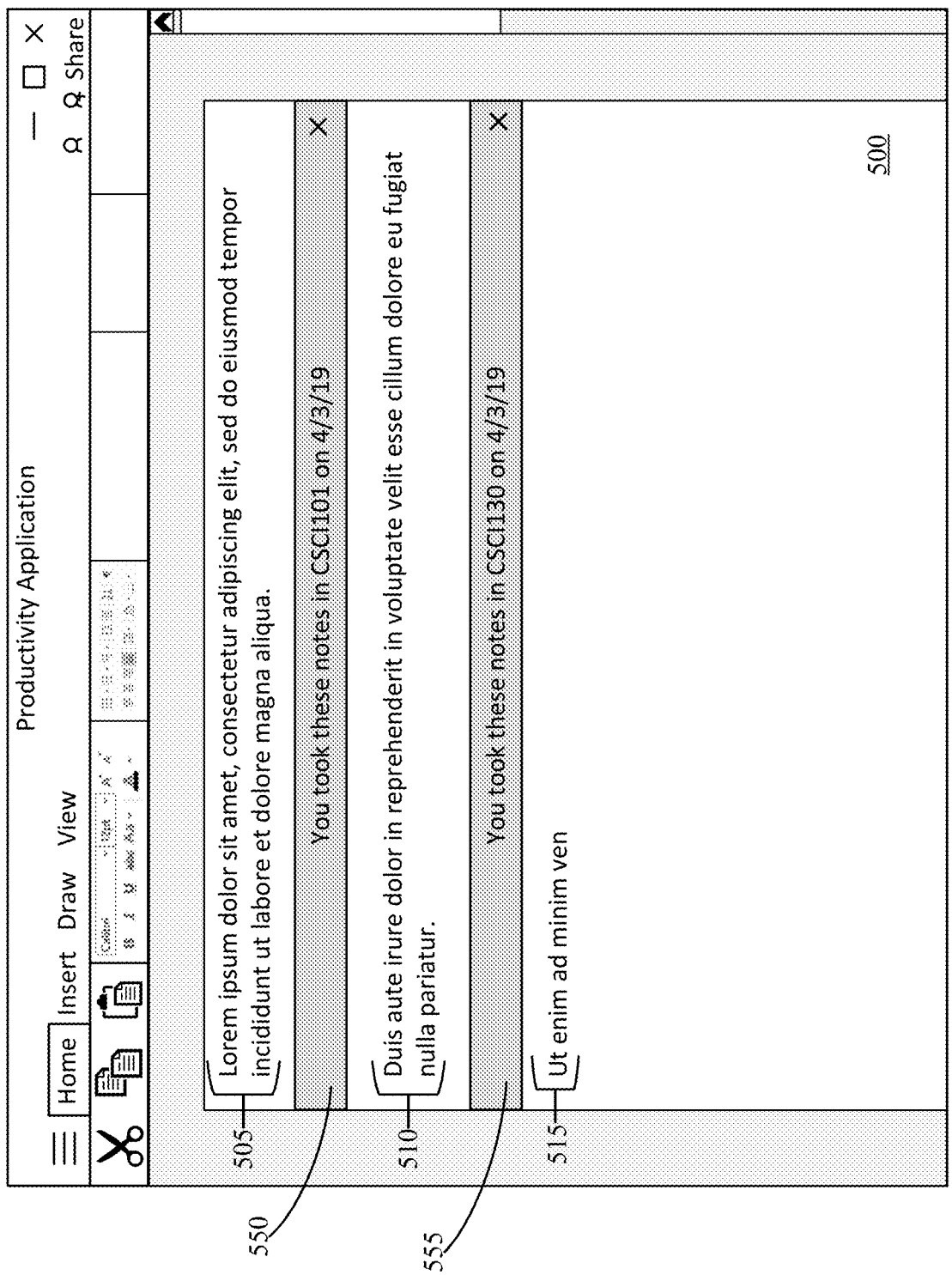
Figure 5C:
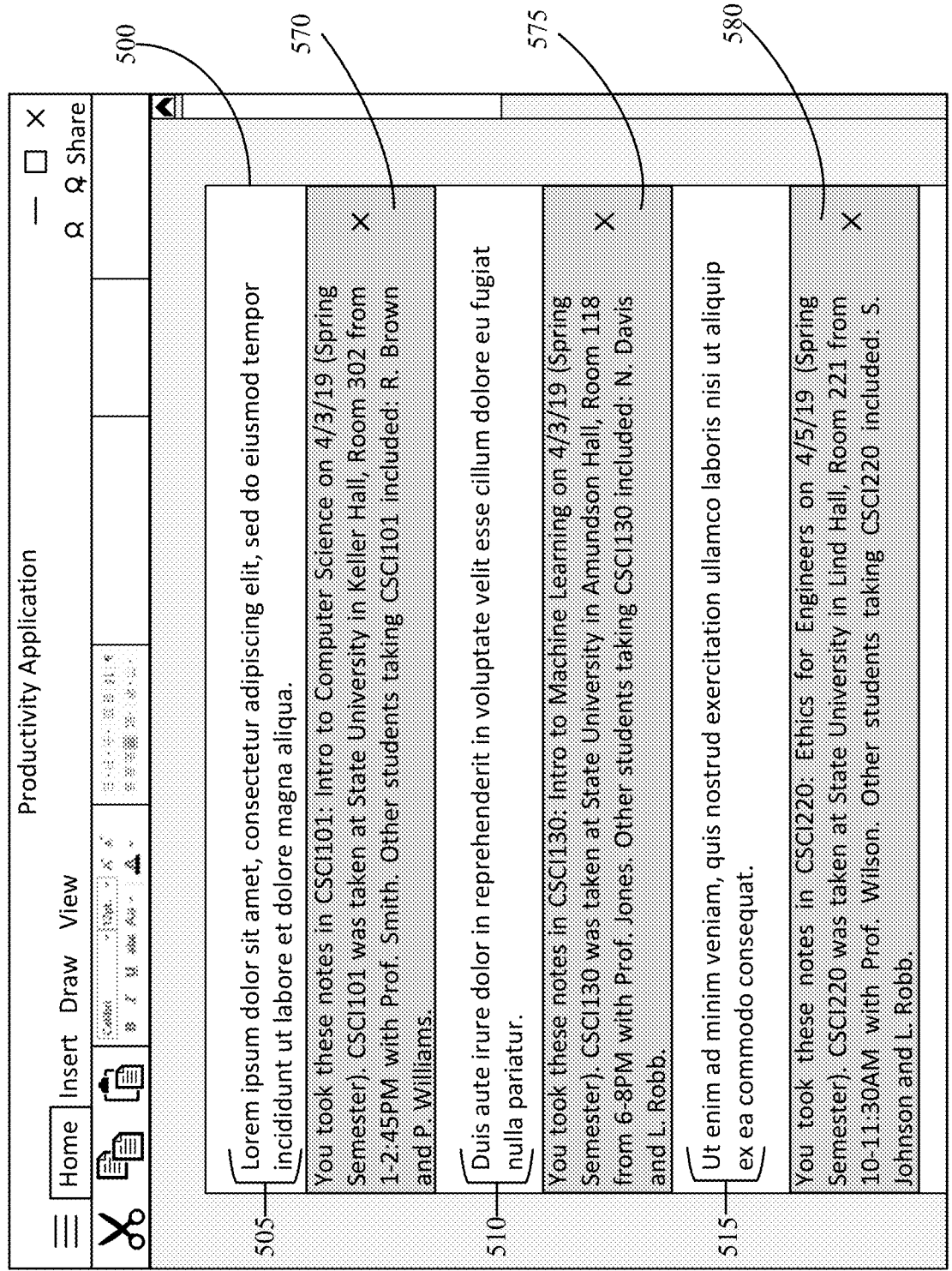

FIGS. 5A-5C illustrate example scenarios for providing trigger-based contextual information capabilities according to example embodiments of the invention. In the example scenarios described in FIGS. 5A-5C, a user is a student at State University and is currently taking three classes during the 2019 spring semester. Class A is CSCI101: Introduction to Computer Science and is taught by Professor Smith. Class A takes place Wednesdays from 1:00 PM to 2:45 PM in Keller Hall, Room 302. Class B is CSCI130: Introduction to Machine Learning and is taught by Professor Jones. Class B takes place Wednesdays from 6:00 PM to 8:00 PM in Amundson Hall, Room 118. Class C is CSCI220: Ethics for Engineers and is taught by Professor Wilson. Class C takes place Fridays from 10:30 AM to 12:00 PM in Lind Hall, Room 221.

The user may open a user interface 500 of a productivity application, such as a note taking application, having a contextual information feature on their computing device (embodied, for example, as system 600 described with respect to FIG. 6). The contextual information feature may be part of a background process or 'always running' type of process such that contextual information is provided to the user without a direct request.

Referring to FIG. 5A, a user can enter user generated content into the user interface 500 of the productivity application. As the user starts interacting with the user interface 500, process 200 as described with respect to FIG. 2 can be initiated. Indeed, the contextual information feature can receive the user generated content (e.g., step 205), store the user generated content in a file (e.g., step 210), obtain context at least a timestamp (e.g., step 215), and store the obtained context as metadata for the user generated content (e.g., step 220).

In the illustrative example, the user attended class A and class B on Wednesday, Apr. 3, 2019 and took notes during each class (e.g., class A notes 505 and class B notes 510). Often times, users may start a continuous block of notes for multiple notes, such as a whole page or even multiple pages. It may be difficult for the user to remember which portion of the block of notes belongs to each class. In this example, the class A notes 505 and the class B notes 510 were taken on the same page and the user did not provide any details as to which notes were taken in each class.

Referring to FIGS. 5B and 5C, after a period of time, the user can view the user interface 500 of the productivity application. As the user views the user interface 500 after an amount of time has passed, contextual information is displayed in order to provide an effective recall of the purpose or original intent of sticky note. Indeed, the contextual information feature can receive a trigger to display contextual information (e.g., step 225), in response to receiving the trigger, obtain current context including at least a current timestamp (e.g., step 230), identify one or more contexts of the obtained context to provide as the contextual information based on the current context including an amount of time between the timestamp in the current timestamp (e.g., step 235), and provide the one or more context for display along with the user generated content (e.g., step 240).

In the illustrative example of FIG. 5B, on Friday, Apr. 5, 2019 the user opens the user interface 500 of the productivity application and begins to take notes for class C (e.g., class C notes 515) on the same page as the class A notes 505 and the class B notes 510. In this case, contextual information is displayed along with each of the class A notes 505 and the class B notes 510.

Since the notes for class A and class B were taken two days prior, the user may only need contextual information indicating the name of the class to remember to which class the notes belong. Thus, contextual information 550 for the class A notes 505 is displayed to the user indicating "You took these notes in CSCI101" and contextual information 555 for the class B notes 510 is displayed to the user indicating "You took these notes in CSCI130."

In the illustrative example of FIG. 5B, since the user is currently writing the class C notes 515, the contextual information feature does not need to provide any contextual information to help the user remember the context surrounding the class C notes 515.

In the illustrative example of FIG. 4C, three years after the time of creation the user opens the user interface 500 of the productivity application to review the notes taken during spring semester of 2019. In this case, contextual information is displayed along with each of the class notes. In particular, contextual information 570 is displayed along with the class A notes 505, contextual information 575 is displayed along with the class B notes 510, and contextual information 580 is displayed along with the class C notes 515.

Since the amount of time passed since the user took the notes is much greater than the one month described in FIG. 5B, the user may have a greater chance of forgetting the context surrounding the notes. In this case, the contextual information displayed to the user includes not only the name of the class in which the notes were taken, but also additional details about the class. Each of the contextual information contains the name of the class, the semester and date the notes were taken, other details about the class, such as where the class was taken and even other students taking the class with the user.

Figure 7:
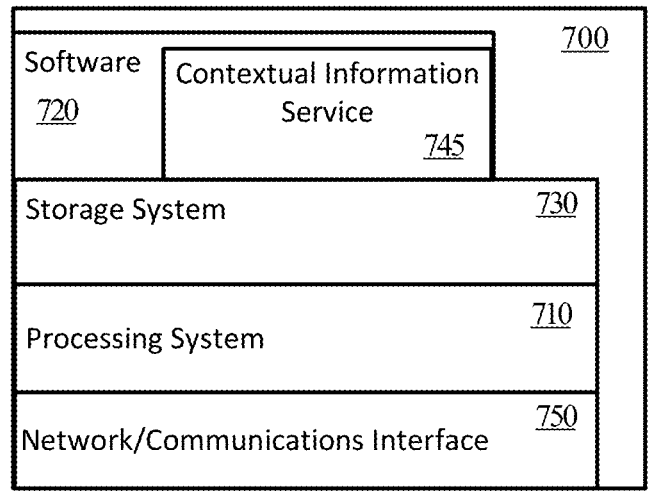
FIG. 7 illustrates components of a computing system that may be used to implement certain methods and services described herein.

FIG. 6 illustrates components of a computing device that may be used in certain embodiments described herein; and FIG. 7 illustrates components of a computing system that may be used to implement certain methods and services described herein.

Referring to FIG. 6, system 600 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 600 may be incorporated to implement a particular computing device.

System 600 includes a processing system 605 of one or more processors to transform or manipulate data according to the instructions of software 610 stored on a storage system 615. Examples of processors of the processing system 605 include general purpose central processing units, application specific processors, and logic devices, as well as any other type of processing device, combinations, or variations thereof. The processing system 605 may be, or is included in, a system-on-chip (SoC) along with one or more other components such as network connectivity components, sensors, video display components.

The software 610 can include an operating system (not shown) and application programs such as application 620 that calls the contextual information service as described herein. Device operating systems generally control and coordinate the functions of the various components in the computing device, providing an easier way for applications to connect with lower level interfaces like the networking interface.

Storage system 615 may comprise any computer readable storage media readable by the processing system 605 and capable of storing software 610 including the application 620.

Storage system 615 may include volatile and nonvolatile memories, removable and non-removable media implemented in any method or technology for storage of information, such as computer readable instructions, data structures, program modules, or other data. Examples of storage media of storage system 615 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal.

Storage system 615 may be implemented as a single storage device but may also be implemented across multiple storage devices or sub-systems co-located or distributed relative to each other. Storage system 615 may include additional elements, such as a controller, capable of communicating with processing system 605.

Software 610 may be implemented in program instructions and among other functions may, when executed by system 600 in general or processing system 605 in particular, direct system 600 or the one or more processors of processing system 605 to operate as described herein.

The system can further include user interface system 630, which may include input/output (I/O) devices and components that enable communication between a user and the system 600. User interface system 630 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 630 may also include output devices such as display screen(s), speakers, haptic devices for tactile feedback, and other types of output devices. In certain cases, the input and output devices may be combined in a single device, such as a touchscreen, or touch-sensitive, display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display (not shown) in myriad ways, presenting graphical user interface elements, text, images, video, notifications, virtual buttons, virtual keyboards, or any other type of information capable of being depicted in visual form.

The user interface system 630 may also include user interface software and associated software (e.g., for graphics chips and input devices) executed by the OS in support of the various user input and output devices. The associated software assists the OS in communicating user interface hardware events to application programs using defined mechanisms. The user interface system 630 including user interface software may support a graphical user interface, a natural user interface, or any other type of user interface. For example, the user interfaces for the application 620 described herein may be presented through user interface system 630.

Network interface 640 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Certain aspects described herein, such as those carried out by the contextual information service described herein may be performed on a system such as shown in FIG. 7. Referring to FIG. 7, system 700 may be implemented within a single computing device or distributed across multiple computing devices or sub-systems that cooperate in executing program instructions. The system 700 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 700 can include a processing system 710, which may include one or more processors and/or other circuitry that retrieves and executes software 720 from storage system 730. Processing system 710 may be implemented within a single processing device but may also be distributed across multiple processing devices or sub-systems that cooperate in executing program instructions.

Storage system(s) 730 can include any computer readable storage media readable by processing system 710 and capable of storing software 720. Storage system 730 may be implemented as a single storage device but may also be implemented across multiple storage devices or sub-systems co-located or distributed relative to each other. Storage system 730 may include additional elements, such as a controller, capable of communicating with processing system 710.

Software 720, including that supporting contextual information service 745, may be implemented in program instructions and among other functions may, when executed by system 700 in general or processing system 710 in particular, direct the system 700 or processing system 710 to operate as described herein for the contextual information service 745 (and its various components and functionality).

System 700 may represent any computing system on which software 720 may be staged and from where software 720 may be distributed, transported, downloaded, or otherwise provided to yet another computing system for deployment and execution, or yet additional distribution.

In embodiments where the system 700 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A network/communication interface 750 may be included, providing communication connections and devices that allow for communication between system 700 and other computing systems (not shown) over a communication network or collection of networks (not shown) or the air.

Certain techniques set forth herein with respect to the application and/or the contextual information service may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory propagating signals.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A computer-implemented method performed by at least one processor, the method comprising:
   receiving user generated content;
   storing the user generated content in a file;
   obtaining context including at least a timestamp indicating a time of creation of the user generated content;
   storing the obtained context as metadata for the user generated content;
   receiving a trigger to display contextual information for the user generated content;
   in response to receiving the trigger to display the contextual information for the user generated content, obtaining current context including at least a current timestamp;
   determining an amount of time between the timestamp indicating the time of creation of the user generated content and the current timestamp;
   identifying one or more contexts of the obtained context to provide as the contextual information based on the current context including the determined amount of time between the timestamp indicating the time of creation of the user generated content and the current timestamp,
   wherein one or more contexts of the obtained context identified based on a greater determined amount of time include additional or different contexts as compared to one or more contexts identified based on a lesser determined amount of time; and
   providing the one or more contexts for display along with the user generated content.

2. The method of claim 1, wherein the trigger is an amount of time from the timestamp.

3. The method of claim 1, wherein the trigger is a request for retrieval of the user generated content.

4. The method of claim 1, wherein the trigger is an amount of user activity.

5. The method of claim 1, wherein providing the one or more contexts comprises inserting the one or more contexts in the file with the user generated content.

6. The method of claim 1, wherein providing the one or more contexts comprises visually distinguishing the one or more contexts from the user generated content.

7. The method of claim 1, wherein the context comprises a user ID, the timestamp, certain actions or inactions by a user, location, content, client type, application type, application state, file, or a combination thereof.

8. The method of claim 1, wherein the current context comprises a user ID, the current timestamp, certain current actions or inactions by a user, current location, current content, current client type, current application type, current application state, current file, or a combination thereof.

9. A system comprising:
   a processing system;
   a storage system; and
   instructions stored on the storage system that, when executed by the processing system, direct the processing system to:
   receive user generated content;
   store the user generated content in a file;
   obtain context including at least a timestamp indicating a time of creation of the user generated content;
   store the obtained context as metadata for the user generated content;
   receive a trigger to display contextual information for the user generated content;
   in response to receiving the trigger to display the contextual information for the user generated content, obtain current context including at least a current timestamp;
   determine an amount of time between the timestamp indicating the time of creation of the user generated content and the current timestamp;
   identify one or more contexts of the obtained context to provide as the contextual information based on the current context including the determined amount of time between the timestamp indicating the time of creation of the user generated content and the current time stamp,
   wherein one or more contexts of the obtained context identified based on a greater determined amount of time include additional or different contexts as compared to one or more contexts identified based on a lesser determined amount of time; and
   provide the one or more contexts for display along with the user generated content.

10. The system of claim 9, wherein the trigger is an amount of time from the timestamp.

11. The system of claim 9, wherein the trigger is a request for retrieval of the user generated content.

12. The system of claim 9, wherein the trigger is an amount of user activity.

13. The system of claim 9, wherein providing the one or more contexts comprises inserting the one or more contexts in the file with the user generated content.

14. The system of claim 9, wherein providing the one or more contexts comprises visually distinguishing the one or more contexts from the user generated content.

15. The system of claim 9, wherein the context comprises a user ID, the timestamp, certain actions or inactions by a user, location, content, client type, application type, application state, file, or a combination thereof.

16. The system of claim 9, wherein the current context comprises a user ID, the current timestamp, certain current actions or inactions by a user, current location, current content, current client type, current application type, current application state, current file, or a combination thereof.

17. A computer readable storage medium having instructions stored thereon that, when executed by a processor, perform a method comprising:
receiving user generated content;
storing the user generated content in a file;
obtaining context including at least a timestamp indicating a time of creation of the user generated content;
storing the obtained context as metadata for the user generated content;
receiving a trigger to display contextual information for the user generated content;
in response to receiving the trigger to display the contextual information for the user generated content, obtaining current context including at least a current timestamp;
determining an amount of time between the timestamp indicating the time of creation of the user generated content and the current timestamp;
identifying a set of contexts of the obtained context to provide as the contextual information based on the current context including the determined amount of time between the timestamp indicating the time of creation of the user generated content and the current timestamp,
wherein a set of contexts of the obtained context identified based on a greater determined amount of time includes additional or different contexts as compared to a set of contexts identified based on a lesser determined amount of time;
providing the set of contexts for display along with the user generated content;
receiving a second trigger to display second contextual information for the user generated content;
in response to receiving the second trigger to display the second contextual information for the user generated content, obtaining second current context including at least a second current time stamp;
determining an amount of time between the timestamp indicating the time of creation of the user generated content and the second current timestamp;
identifying a second set of contexts of the obtained context to provide as the second contextual information based on the second current context including the determined amount of time between the timestamp indicating the time of creation of the user generated content and the second current timestamp,
wherein a second set of contexts of the obtained context identified based on a greater determined amount of time between the timestamp indicating the time of creation of the user generated content and the second current timestamp includes additional or different contexts as compared to a second set of contexts of the obtained context identified based on a lesser determined amount of time between the timestamp indicating the time of creation of the user generated content and the second current timestamp; and
providing the second set of contexts for display along with the user generated content.

18. The medium of claim 17, wherein the trigger is an amount of time from the time stamp.

19. The medium of claim 17, wherein the second trigger is a request for retrieval of the user generated content.

20. The medium of claim 17, wherein providing the set of contexts comprises inserting the set of contexts in the file with the user generated content.

* * * * *